United States Patent
Daus et al.

[11] Patent Number: 6,085,549
[45] Date of Patent: *Jul. 11, 2000

[54] MEMBRANE PROCESS FOR PRODUCING CARBON DIOXIDE

[75] Inventors: Paul A. Daus, Sugar Land; Charles R. Pauley, Houston; John W. Koenst, Katy, all of Tex.; Fred Coan, Antioch, Calif.

[73] Assignee: Messer Griesheim Industries, Inc., Malvern, Pa.

[ * ] Notice: This patent issued on a continued prosecution application filed under 37 CFR 1.53(d), and is subject to the twenty year patent term provisions of 35 U.S.C. 154(a)(2).

[21] Appl. No.: 09/057,126

[22] Filed: Apr. 8, 1998

[51] Int. Cl.⁷ .......................................... F25J 1/00

[52] U.S. Cl. ................................ 62/624; 62/922; 62/929; 95/51

[58] Field of Search ............................ 62/624, 922, 929; 95/51

[56] References Cited

U.S. PATENT DOCUMENTS

| | | | |
|---|---|---|---|
| 2,065,112 | 12/1936 | Bottoms | 23/2 |
| 2,143,283 | 1/1939 | Schmidt | 62/175.5 |
| 2,159,434 | 5/1939 | Frey | 196/94 |

(List continued on next page.)

FOREIGN PATENT DOCUMENTS

| | | |
|---|---|---|
| 658973 | 3/1963 | Canada . |
| 0 051 469 | 5/1982 | European Pat. Off. . |
| 0 110 858 A1 | 6/1984 | European Pat. Off. . |
| 0 799 634 | 10/1997 | European Pat. Off. . |
| 0658245 | 10/1997 | European Pat. Off. . |
| 2 005 152 | 4/1979 | Guadeloupe . |
| 59-69415 | 4/1984 | Japan . |
| 59-207827 | 11/1984 | Japan . |
| 62-167390 | 7/1987 | Japan . |
| 63-151332 | 6/1988 | Japan . |
| 63-305915 | 12/1988 | Japan . |
| 64-43329 | 2/1989 | Japan . |
| 1108512 | 4/1968 | United Kingdom . |
| 1471699 | 4/1977 | United Kingdom . |
| 1590813 | 6/1981 | United Kingdom . |
| 2151597 | 7/1985 | United Kingdom . |
| 2174379 | 11/1986 | United Kingdom . |
| 2183499 | 6/1987 | United Kingdom . |
| 2186682 | 8/1987 | United Kingdom . |

OTHER PUBLICATIONS

Bruno, Earl R., "Drilling With Air," *The Petroleum Engineer*, Jan. 1956, B21–B24.

S.P. Shouldice, "Liquid Nitrogen Developments and Applications in Drilling and Completion Operations," 15$^{th}$ Annual Technical Mtg. P&NG Division, C.L.M., Calgary, May 1964, pp. 158–164.

Billy C. Caskey, "Use of Inert Drilling Fluid to Control Geothermal Drill Pipe Corrosion," Corrosion/81, paper No. 224, Apr. 6–10, 1981, pp. 224:1–224:12.

Raghu S. Narayan, "Application of Monsanto Prism Separators for CO2 Removal," Paper presented at Permian Basin Regional Mtg of Gas Processors Assoc., May 6, 1982.

Schell, William J., "Use of Membranes for Biogas Treatment," *Energy Progress*, Jun. 1983, vol. 3 No. 2, pp. 96–100.

S.A. Stern et al, "Recycle and Multimembrane Permeators for Gas Separations," *Journal of Membrane Science*, 20(1984) pp. 25–43.

(List continued on next page.)

*Primary Examiner*—Ronald Capossela
*Attorney, Agent, or Firm*—Carr & Storm, L.L.P.

[57] ABSTRACT

A process for producing carbon dioxide from a gas stream containing same pretreats the incoming raw gas to remove contaminants and particularly to protect degradation of the membranes utilized for separation. The temperatures of the various gas streams are carefully controlled to reduce water from the stream. By-product and other gas streams of the process are recycled in order to increase efficiency by utilizing the heating or cooling properties of the streams. In addition, streams containing minor portions of carbon dioxide are returned to the system for recovery.

55 Claims, 1 Drawing Sheet

U.S. PATENT DOCUMENTS

| | | | |
|---|---|---|---|
| 2,377,966 | 12/1945 | Reed | 23/150 |
| 2,399,142 | 4/1946 | Reed | 23/2 |
| 2,583,601 | 1/1952 | Schwertz | 183/115 |
| 2,786,652 | 3/1957 | Wells | 255/24 |
| 2,970,106 | 1/1961 | Binning et al. | 208/347 |
| 3,137,654 | 6/1964 | Johnson et al. | 252/189 |
| 3,250,080 | 5/1966 | Garwin | 62/24 |
| 3,286,778 | 11/1966 | Jackson | 175/69 |
| 3,307,330 | 3/1967 | Niedzielski et al. | . |
| 3,612,192 | 10/1971 | Maguire, Jr. | 175/17 |
| 4,119,417 | 10/1978 | Heki et al. | 66/158 |
| 4,130,403 | 12/1978 | Cooley et al. | 55/16 |
| 4,136,747 | 1/1979 | Mallory et al. | 175/66 |
| 4,161,222 | 7/1979 | Pye | 175/66 |
| 4,181,675 | 1/1980 | Makin et al. | 260/449.5 |
| 4,238,211 | 12/1980 | Stuart | 62/20 |
| 4,264,338 | 4/1981 | Null | 55/16 |
| 4,374,657 | 2/1983 | Schendel et al. | 62/19 |
| 4,386,944 | 6/1983 | Kimura | 55/16 |
| 4,417,449 | 11/1983 | Hegarty et al. | 62/28 |
| 4,435,191 | 3/1984 | Graham | 55/16 |
| 4,466,946 | 8/1984 | Goddin, Jr. et al. | 423/228 |
| 4,477,419 | 10/1984 | Pearce et al. | 423/228 |
| 4,529,411 | 7/1985 | Goddin, Jr. et al. | 55/16 |
| 4,542,010 | 9/1985 | Roman et al. | 423/579 |
| 4,548,619 | 10/1985 | Steacy | 55/16 |
| 4,589,896 | 5/1986 | Chen et al. | 62/28 |
| 4,597,777 | 7/1986 | Graham | 55/16 |
| 4,599,096 | 7/1986 | Burr | 62/27 |
| 4,602,477 | 7/1986 | Lucadamo | 62/24 |
| 4,639,257 | 1/1987 | Duckett et al. | 55/16 |
| 4,659,343 | 4/1987 | Kelly | 55/16 |
| 4,681,612 | 7/1987 | O'Brien et al. | 62/624 |
| 4,690,695 | 9/1987 | Doshi | 55/16 |
| 4,701,187 | 10/1987 | Choe et al. | 55/16 |
| 4,717,395 | 1/1988 | Chiao | 55/16 |
| 4,759,780 | 7/1988 | Yamada et al. | 55/158 |
| 4,781,907 | 11/1988 | McNeill | 423/351 |
| 4,797,141 | 1/1989 | Mercader et al. | 62/17 |
| 4,871,378 | 10/1989 | Pinnau | 55/16 |
| 4,881,953 | 11/1989 | Prasad, et al. | . |
| 4,894,068 | 1/1990 | Rice | 55/16 |
| 4,936,887 | 6/1990 | Waldo | . |
| 4,960,579 | 10/1990 | Campbell | 423/351 |
| 4,990,168 | 2/1991 | Sauer et al. | 62/24 |
| 5,032,148 | 7/1991 | Baker et al. | 55/16 |
| 5,082,481 | 1/1992 | Barchas et al. | 62/624 |
| 5,090,971 | 2/1992 | Barbier | 55/16 |
| 5,102,432 | 4/1992 | Prasad | 55/16 |
| 5,207,806 | 5/1993 | Lagree et al. | 55/16 |
| 5,233,837 | 8/1993 | Callahan | 62/38 |
| 5,234,471 | 8/1993 | Weinberg | 95/47 |
| 5,275,640 | 1/1994 | Schroter et al. | 95/101 |
| 5,282,968 | 2/1994 | Lee | 210/640 |
| 5,282,969 | 2/1994 | Xu | 210/640 |
| 5,314,528 | 5/1994 | Monereau | 95/55 |
| 5,332,424 | 7/1994 | Rao et al. | 95/51 |
| 5,388,650 | 2/1995 | Michael | 175/71 |
| 5,411,721 | 5/1995 | Doshi et al. | 423/220 |
| 5,445,669 | 8/1995 | Nakabayashi et al. | 96/5 |
| 5,482,539 | 1/1996 | Callahan | 95/51 |
| B1 5,388,650 | 9/1997 | Michael | 175/71 |

OTHER PUBLICATIONS

D.J. Stookey et al, "Natural Gas Processing With Prism Separators," AIChE Winter Annual Meeting, Mar. 13, 1984, Atlanta, Georgia, paper 33F.

J.E. Smith et al, "Development of the Cotton Valley Geopressure Zone in Panola County, Texas, Using Air/Drilling and Openhole Completion Techniques," Society of Petroleum Engineers (SPE14657), Tyler, TX Apr. 21–22, 1986, pp. 67–78.

J.E. Perrin, et al., "Separation of a Helium–Methane Mixture in Permeators with Two Types of Polymer Membranes," *AIChE Journal,* Nov. 1986, vol. 32, No. 11, pp. 1889–1901.

A.K. Fritzsche et al, "Gas Separations by Membrane Systems," *Chemical Economy & Engineering Review,* vol. 19, No.1–2–3, pp. 19–29.

Wilbur C. Kratz, et al., "Hydrogen and Carbon Dioxide Coproduction from SMR Off–Gas by Pressure Swing Adsorption," AIChE National Mtg in New York, Nov. 20, 1987.

M. Sidhoum, et al., "Experimental Behavior of Asymmetric CA Membranes and Its Use in Novel Separation Schemes," *AIChE Symposium Series,* No. 261, vol. 84, pp. 102–112.

K.D. Kothe et al, "A Study of the Separation Behavior of Different Membrane Columns with Respect to Ternary Gas Mixtures," *Journal of Membrane Science,* 46(1989) pp. 261–281.

Spillman, Robert W., "Economics of Gas Separation Membranes," *Chemical Engineering Progress,* Jan. 1989, pp. 41–62.

Robert W. Spillman et al, "Membrane Gas Treating," Proceedings of the 68th Annual Gas Processors Assoc. Convention, pp. 186–196.

M.S. Dinello et al, "Bulk CO2 Removal Achieved Through Membrane Separation," *SPE Production Engineering,* Feb. 1989, vol. 4 No. 1, pp. 88–92.

"Membrane Separation Offers Low–cost Inert Gas Safety," *Ocean Industry,* Jul. 1990, pp. 27–29.

"Nitrogen Generators," *Power News,* vol. 31–No. 1, Spring 1991.

Shelley, Suzanne, "Out of Thin Air," *Chemical Engineering,* Jun. 1991, pp. 30–41.

1991–1992 Stewart & Stevenson Petroleum Products Catalog.

P.D. Allan, "Nitrogen Drilling System for Gas Drilling Applications," *Society Of Petroleum Engineers 28320,* Sep. 1994, pp. 291–295.

Downey, Robert A., "On–Site Generated Nitrogen For Oil and Gas Well Drilling and Other Applications," CAODC Spring Drilling Conference, Apr. 19–21, 1995, Calgary, Alberta, Canada.

WO 0 92 19358, Nov. 12, 1992, International Application Published by WIPO; PCT Application.

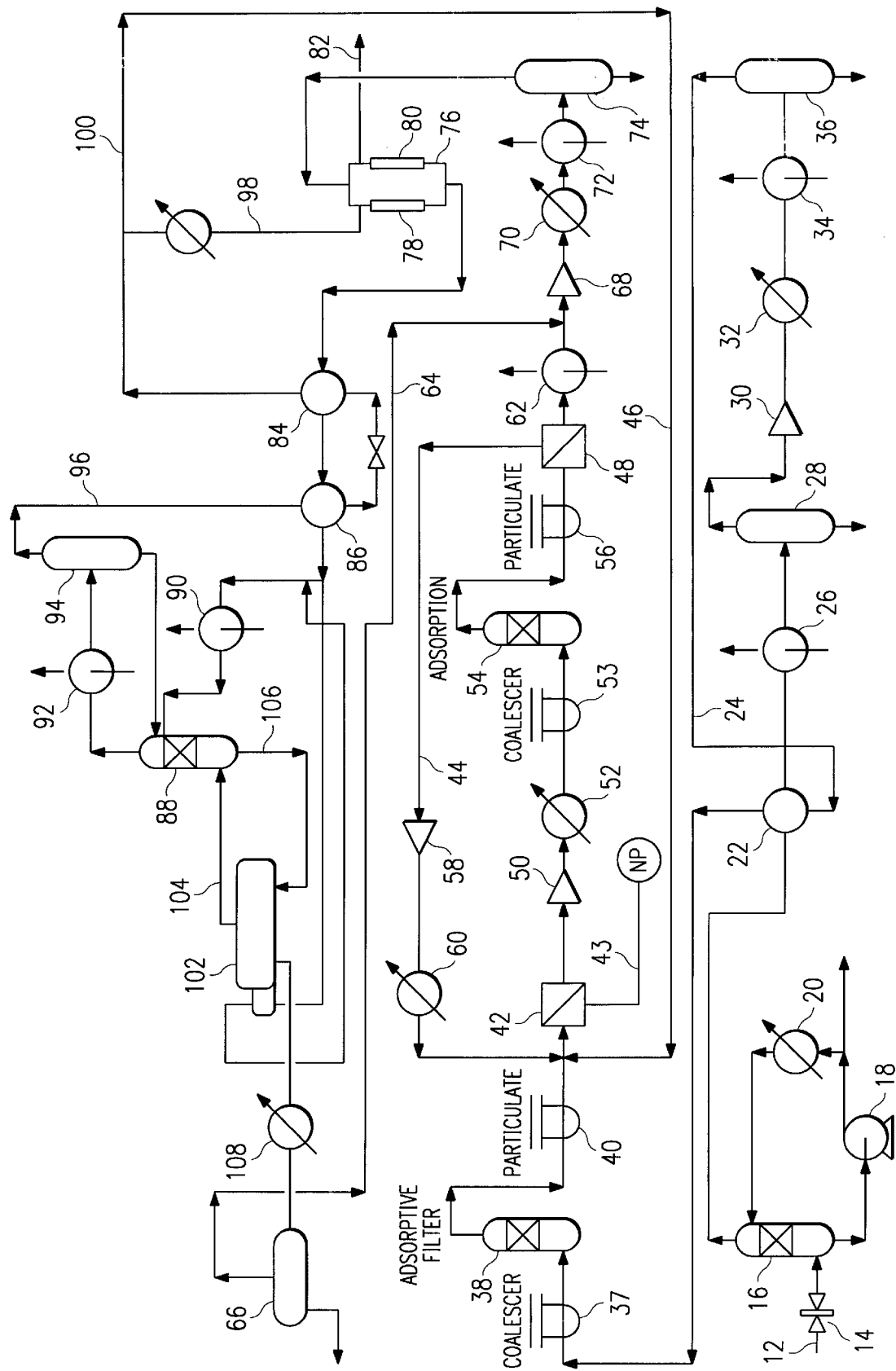

6,085,549

MEMBRANE PROCESS FOR PRODUCING CARBON DIOXIDE

TECHNICAL FIELD

The present invention relates to the separation of carbon dioxide from a raw gas stream containing same.

BACKGROUND

High purity carbon dioxide is an important chemical used extensively by the food and beverage industry, and, amongst other things, for PH control in wastewater treatment and as a carbon source in chemical manufacturing. Carbon dioxide is used to carbonate soft drinks and liquid carbon dioxide is expanded to freeze fresh foods. The primary sources of carbon dioxide are by-product streams from chemical processes, natural underground formations and combustion gases. Combustion gases are the oldest and most widely available source.

Heretofore, attempts to recover carbon dioxide from exhaust gases were by processes using a chemical solvent to scrub the gas and thereafter distilling to recover the carbon dioxide. Such methods are costly and meet with problems regarding corrosion and solvent degradation. Examples of such processes and methods to alleviate the corrosion problems are found in U.S. Pat. No. 2,065,112 which issued in 1936, U.S. Pat. No. 2,399,142 which issued in 1946, U.S. Pat. No. 2,377,966 which issued in 1945, U.S. Pat. No. 4.477.419 which issued in 1948, U.S. Pat. No. 3,137,654 which issued in 1964. The alkanolamine process described in some of these patents is still widely used today.

More recently, commercial membrane technology has been developed for separating acid gases like carbon dioxide and hydrogen sulfide from light hydrocarbon gases. Examples of such art are found in U.S. Pat. No. 4,130,403 which issued Dec. 19, 1978 to T. E. Cooley et.al., U.S. Pat. No, 4,639,257 which issued Jan. 27, 1987 to Melvyn Duckett et.al., and U.S. Pat. No. 5,233,837 which issued Aug. 10, 1993 to Richard Callahan. The features of these patents, particularly the use of membrane separation, was a definite step forward in the carbon dioxide separation art. However, the prior art in this field continues to suffer from overall efficiency of the process and undesirable membrane life. These problems have been significantly mitigated by the apparatus and process of this invention.

SUMMARY OF THE INVENTION

The invention encompasses a system for recovering or at least increasing the relative concentration of a target gas from or in a mixture of gases in which the target gas is entrained. In one aspect of the invention, a target gas, specified as carbon dioxide, is separated from a raw gas stream which contains carbon dioxide in an amount, on a dry basis, in the range of about 10 percent to about 85 percent.

In the process, contaminants are removed from the gas stream by direct contact cooling and passing the gas through heat exchangers and water knockouts. Contaminants are further removed by an absorption filter and a coalescing filter. The gas is thereby conditioned for efficient membrane separation.

The resultant treated gas is thereafter progressively passed through first and second membranes with nonpermeate gas recycling from the second membrane to the inlet of the first membrane. The gas is further filtered as it passes between the first and second membranes. Permeate gas passing through the second membrane is pre-conditioned and water is removed prior to passing the gas through a desiccant filter from which desiccated gas is thereafter cryogenically distilled and liquid carbon dioxide is recovered.

Effluent gas from the distilling column is recycled to the cooling apparatus immediately upstream of the desiccant filter, for improved efficiency.

Further, efficiencies are realized by capturing vapors from carbon dioxide storage and returning them to the system for reprocessing.

In another aspect of the invention, the process of the invention remains basically the same, but greater detail is claimed with regard to pretreating the process streams and recycling specific streams for purposes of increased efficiency of the process, improved quality of carbon dioxide from the process, and increased carbon dioxide recovery:

BRIEF DESCRIPTION OF THE DRAWINGS

A more complete understanding of the invention and its advantages will be apparent from the detailed description taken in conjunction with the accompanying single drawing in which:

FIG. 1 is a schematic view of the apparatus of the process of this invention.

DETAILED DESCRIPTION

The preferred embodiments of the present invention and its advantages are best understood by referring to FIG. 1 of the drawings.

Referring to FIG. 1, the raw feed gas enters the gas processing apparatus 10 of this invention via line 12 and, where particulate matter is heavily laden in the raw feed gas stream, the gas stream preferably enters the system through a venturi scrubber 14.

The venturi scrubber 14 is positioned ahead of a direct contact cooler 16 which contains a water scrubbing fluid that is recirculated through the direct contact cooler 16 by a pump 18 and cooled by a recycle heat exchanger 20. Excess water in the direct contact cooler 16, from condensation of water vapor in the raw gas stream, is discharged and constant water level is maintained in the direct contact cooler 16.

Where sulfur dioxide is present in the raw gas stream entering the direct contact cooler 16, it is preferred that sodium hydroxide be added to the water scrubbing fluid to remove the sulfur dioxide. The recycle heat exchanger 20 is preferably a gas-gas recycle heat exchanger 20 that is cooled by air, but can be a water cooled heat exchanger without departing from this invention.

The gas stream exiting the direct contact cooler 16 passes through a recycle gas-gas heat exchanger 22 which cools the gas stream to about 90 degrees F. by heat exchange with a hereafter more fully described refrigerant heat exchanger 26 to progressively lower the temperature of the gas stream entering a first water knockout 28.

In the refrigerant heat exchanger 26, the gas stream has been cooled sufficiently that the dewatered gas stream exiting the top of the first water knockout 28 and entering a compressor 30 is substantially free of water which would condense in the compressor 30 and cause damage. The first water knockout 28 has sufficient static head to dump condensate water to atmosphere even when the gas stream is under slight vacuum.

The pressure of the gas stream is increased as it passes through the compressor 30 and is thereafter cooled by heat exchanger 32 and refrigerant heat exchanger 34 and water is removed from the gas stream by another second knockout 36. The pressure of the gas stream exiting the top of the second knockout 36 is sufficient to subsequently pass through the heat exchanger 22 and subsequently through a coalescing filter 37, adsorption filter 38, and a particulate filter 40 and exit the particulate filter 40 at a pressure designated as the optimum operating pressure for the first membrane 42 immediately downstream therefrom. Alternatively, if an oil free compressor is used in place of compressor 30, such as a centrifugal compressor, coalescing filter 37, adsorption filter 38, and particulate 40 should not be necessary and could be omitted.

The gas stream exiting the compressor 30 is cooled by the water or air cooled heat exchanger 32 to a temperature of about 100 degrees F. and immediately thereafter is deep cooled by the refrigerant heat exchanger 34 to a temperature sufficient to achieve about 40 per cent relative humidity at the first membrane feed temperature and pressure. It should be noted that in passing through the second water knockout 36, and particularly through the gas-gas heat exchanger 22, the gas stream is heated and subsequently contacts the first membrane at a temperature of about 100 degrees F.

As the gas passes through the coalescing filter 37 and the adsorption filter 38, traces of compressor oil, sulfur compounds and other particulates are removed. The gas stream then passes through the particulate filter 40 which functions to remove particulate contaminants passing from the adsorption filter 38. Prior to the first membrane 42, a recycle gas stream 44 is mixed with the gas stream entering at the point in the filters best able to remove the contaminates, optimally after particulate filter 40, if the compressor 58 is oil free.

The pressure drop across the first membrane 42, between the feed stream and the non-permeate stream, is maintained in the range of about 5–30 psig., preferably at about 5 psig. operating at about 100 degrees F. and a 90 psig. feed pressure. At the first membrane 42, the gas stream is separated into a nonpermeate stream and a permeate stream. The nonpermeate stream is removed from the system through a line 43. The permeate gaseous stream remaining in the system is discharged from and exits the first membrane 42 for further treatment by a second membrane 48.

The permeate stream discharged or exiting from the first membrane 42 is thereafter preferably pressurized by an oil-lubricated screw compressor 50 to about 90 psig, cooled by a water or air heat exchanger 52 to about 100 degrees F., and thereafter filtered through a coalescing filter 53, adsorption filter 54, and particulate filter 56 to remove any trace of compressor oil. Alternatively, if an oil-free compressor is used in place of compressor 50, such as a centrifugal compressor, coalescing filter 53, adsorption filter 54 and particulate filter 56 should not be necessary and could be omitted. The gas stream exiting from the coalescing filter 56 is then passed into contact with the second membrane 48.

The second membrane 48 separates the incoming gas stream previously discharged as permeate from the first membrane 42 into a nonpermeate recycle gas stream 44 and a discharged permeate stream having a relatively higher concentration of the carbon dioxide target gas relative to the recycle gas stream. The nonpermeate recycle gas stream 44, as described above, is recycled and enters the inlet of the first membrane 42 via a compressor 58 and a heat exchanger 60. The recycle gas stream 44 is pressurized and cooled to about the pressure and temperature of the gas entering the inlet of the first membrane 42. The reason for recycling the nonpermeate gas stream from the second membrane is that it generally contains a greater volume of carbon dioxide than the feed stream entering the first membrane 42.

The first membrane 42 and second membrane 48 of this invention can be any of the well known operable membranes, but it is preferred to use those wherein the carbon dioxide permeability is at least 10 times that of the gas or gases from which it is to be separated under the chosen separation conditions. Examples of suitable membranes are those formed from polysulfone, polyimide, polyamide, glassy polymers or cellulose acetate.

It should be understood that it is desired that the permeate stream of the first membrane 42 be of optimum carbon dioxide recovery and that the permeate stream of the hereafter second membrane 48 be of optimum carbon dioxide purity. It should also be understood that it is preferred that the membrane material forming each of the membranes be the same.

The pressure differential between the permeate gaseous stream previously discharged from the first membrane 42, measured at the point of entry of the second membrane 48 and the discharged non-permeate gaseous stream 44 exiting the second membrane 48, is preferably maintained at a higher value than the pressure differential between the corresponding incoming stream 43 and exiting non-permeate stream of the first membrane 42. Preferably, the pressure differential between the incoming stream and exiting non-permeate stream associated with the second membrane 48 should be substantially maintained at about 30 psig, while the pressure differential between the incoming stream and non-permeate stream associated with the first membrane 42 should be substantially maintained at about 5 psig.

The permeate gas stream discharged from the second membrane 48 is cooled by a heat exchanger 62 to a temperature of about 50 degrees F. and immediately thereafter a recycle stream 64 is added to the cooled stream exiting the heat exchanger 62. The recycle stream 64 is a stream which comprises vapors that are recovered from a carbon dioxide insulated storage tank 66 of the gas processing apparatus 10 of this invention. The gas stream resulting from apparatus 10 has been tested to be in excess of 90 per cent by volume carbon dioxide at about 100 degrees F. and atmospheric pressure. Pre-cooling the gas stream results in lowering the horsepower required to boost the pressure of the stream to the liquefaction pressure and assure no water will condense during compression.

The resultant gas stream is thereafter pressurized by compressor 68 to a pressure of about 300 psig, cooled by heat exchangers 70, 72, and passed to a water knockout 74. The first entered heat exchanger 70 is a water or air heat exchanger which functions to cool, to a temperature of about 100 degrees F., the gas stream exiting from the compressor 68. The cooled gas stream is thereafter passed through a refrigerant heat exchanger 72, deep cooled to a temperature of about 50 degrees and delivered to the water knockout 74 where additional water may be removed.

It should be understood that the compressors 30, 50, and 68 used in this invention can be of various types and makes such as centrifugal, reciprocating, or screw type, without departing from this invention. However, an oil lubricated screw type compressor is preferred.

The gas stream is passed from the water knockout 74, into and through a desiccant filter system 76. Preferably, the desiccate filter system 76 has first desiccant filter bed 78 and second desiccant filter bed 80 connected in parallel and controllable to selectively pass the gas stream through a selected one of the first desiccant filter bed 78 and second desiccant filter bed 80. By this construction, when one of the first desiccant filter bed 78 and second desiccant filter bed 80 is drying the gas received from the water knockout 74, the other desiccant filter bed can be regenerated. Regeneration of one of the first desiccant filter bed 78 and second desiccant filter bed 80 generally requires about eight hours of heating by passing desiccated carbon dioxide or distillation column vent gas through the bed at a temperature of about 450 degrees F., after which the bed must be cooled for about four hours.

The preferred desiccant filter media is one of activated alumina or molecular sieves, however it would be understood that other media can be used without departing from this invention. Vent gas passing from the desiccant filter system via line 82 is not generally recirculated into the system since it would undesirably add water to the gas processing system.

A carbon dioxide gas stream is discharged from the desiccate filter system 76, cooled by first and second gas-gas heat exchangers 84, 86 and thereafter passed to an upper portion of a distillation column 88 via a primary condenser 90.

In the distillation column 88, fluid from the primary condenser 90 passes downwardly in countercurrent flow to stripping vapors generated by reboiling the liquid carbon dioxide at cryogenic temperatures in the range of about −10 degrees F. to about 10 degrees F.

Noncondensible gases and some carbon dioxide gas, hereafter referred to as effluent gas, leaves the top of the distillation column 88 and pass through an overhead condenser 92 where a significant portion of the carbon dioxide is recovered from a sump 94 of the overhead condenser 92, or simply falls back into the column where the overhead condenser 92 is situated directly above the distillation column 88, and returned to an upper portion of the distillation column 88 as reflux. Both the primary condenser 90 and the overhead condenser 92 are chilled with refrigerant. The preferred refrigerant is liquid ammonia, although other refrigerants may be used, such as propane, fluorocarbons, or carbon dioxide.

An effluent gas stream from an upper portion of the sump 94, or from the overhead condenser 92 itself if mounted atop the distillation column 88, is recycled back into the gas processing system 10. The effluent gas stream 96 is first passed in heat exchange relationship through the second gas-gas heat exchanger 86 and then in heat exchange relationship through the first gas-gas heat exchanger 84. By so prechilling the feed to the distillation column with this effluent gas stream 96, the overall load on the primary condenser is reduced, thereby representing the saving of power.

There is a pressure let down valve between gas-gas heat exchangers 84, 86 to reduce the temperature of the gas in effluent gas stream 96 after it is heated in gas-gas heat exchanger 86. The effluent gas stream is thereafter split into two separate streams. One of the streams 98 of the split is heated by passing through an electric heater then passed to the desiccant dryer for operation of regeneration and the other stream 100 of the split is recycled into the inlet of the first membrane 42 (as described in U.S. Pat. No. 4,639,257 "Recovery of Carbon Dioxide From Gas Mixture" which issued to Melvyn Duckett, et al on Jan. 27, 1987 and which is hereby incorporated by reference), or vented to atmosphere.

A solution reboiler 102 receives carbon dioxide discharging from the bottom of the distillation column 88. The solution reboiler 102 generates the stripping vapors which are passed through line 104 into a bottom portion of the distillation column 88. The solution reboiler 102 has liquid carbon dioxide on the shell side of the solution reboiler 102 and distillation column 88 feed, prior to the primary condenser 90, on the tube side of the solution reboiler 102. Any stream warmer than the column bottom fluid can be used in the reboiler. The preferred warm vapor used to reboil the solution is a slip stream of compressed and dehydrated carbon dioxide, which further reduces the refrigeration load on the primary condenser 90 and avoids waste of power.

Liquid carbon dioxide passes from the bottom of the distillation column 88 via line 106 at a pressure of about 250 psig and a temperature in the range of about −10 degrees F. to about 10 degrees F. This liquid carbon dioxide stream passes through a refrigerant cooled subcooler 108 where the liquid is cooled below the bubble point by several degrees and then passed to the aforementioned insulated storage tank 66 where overhead vapor is recycled to the intake of compressor 68. By so returning tank vapors, the efficiency of carbon dioxide recovery is improved. The following are example operating conditions and recoveries of the process of this invention:

EXAMPLE

| STREAM | DESCRIPTION | SCFM | % Vol. | | | |
|---|---|---|---|---|---|---|
| | | | CO2 | N2 | O2 | H2O |
| 12 | Raw feed gas | 7,200 | 18.0 | 69.3 | 2.7 | 10.0 |
| | M-1 NP vent | 5,090 | 2.1 | 96.5 | 1.4 | 0 |
| 44 | M-2 recycle | 3,055 | 26.3 | 66.4 | 7.3 | trace |
| | Column feed | 1,392 | 85.6 | 5.5 | 8.9 | 0 |
| 96 | Column effluent | 500 | 60.0 | 15.3 | 24.7 | 0 |
| 98 | Regen gas feed | 49 | 60.0 | 15.3 | 24.7 | 0 |
| 100 | Column vent | 451 | 60.0 | 15.3 | 24.7 | 0 |

| EQUIPMENT | DESCRIPTION | TEMP.F. | PSID |
|---|---|---|---|
| 20 | Heat exchanger | 106.0 | 5 |
| 22 | Gas-Gas HTX | 10.0 (approach) | 2 |
| 26 | Heat exchanger | 45.0 | 2 |
| 32 | Heat exchanger | 100.0 | 2 |
| 34 | Heat exchanger | 45.0 | 2 |
| 52 | Heat exchanger | 101.2 | 2 |
| 60 | Heat exchanger | 100.0 | 2 |
| 62 | Heat exchanger | 45.0 | 2 |
| 70 | Heat exchanger | 100.0 | 2 |
| 72 | Heat exchanger | 45.0 | 2 |
| 84 | gas-gas HTX | 10.0 (approach) | 2 |
| 86 | gas-gas HTX | 10.0 (approach) | 2 |
| 90 | Primary cond. | −30.0 | 2 |
| 92 | Vent cond. | −31.0 | 2 |
| 108 | Subcooler | −15.0 | 2 |
| | Heater | 450.0 | 2 |
| | Refrig. Pkg. | 100.0 | 2 |
| | Refrig. Pkg. | bubble point | 2 |
| 102 | Reboiler (bottom) | 4.8 | 2 |

| EQUIPMENT | DESCRIPTION | PSIG | STAGES | BHP |
|---|---|---|---|---|
| 18 | Wash water pump | 90.0 | 1 | 13 |
| 30 | 1st.stage comp. | 111.0 | 2 | 1,595 |
| 50 | 2nd.stage comp. | 107.0 | 2 | 929 |
| 58 | Recyc.Comp. | 92.0 | 1 | 102 |
| 68 | Prod. Comp. | 343.0 | 2 | 460 |
| | Refrig. Comp. | 200.0 | 1 | 218 |
| | Refrig. Comp. | 58.5 | 1 | 120 |

-continued

| EQUIPMENT | EXAMPLE DESCRIPTION | NON-PERM. PSID | MODULES |
|---|---|---|---|
| 42 | 1st stage membrane | 5 | 581 |
| 48 | 2nd stage membrane | 30 | 46 |

The overall process efficiency and, specifically, membrane life is markedly improved by the novel techniques employed in the process. Pretreating the raw feed gas removes trace contaminants such as sulfur dioxide, nitrogen oxides, and particulate. Chilling the raw feed gas stream upstream of the first membrane 42 and second membrane 48 improves removal of the bulk of the water and thereby extends membrane life, reduces compressor horsepower, and reduces downstream desiccant refrigeration heat. The first membrane 42 and the second membrane 48 are protected by the coalescing filter 37, adsorption filter 38, particulate filter 40, and heat exchanger 52, coalescing filter 53, adsorption filter 54, and particulate filter 56 to remove all traces of sulfur compounds, residual oxides of nitrogen, and particulate. Recovery of carbon dioxide from the first membrane 42 is maximized and purity of carbon dioxide from the second membrane 48 is maximized by recycling the recycle gas stream 44 of the second membrane 48 back to the first membrane 42.

Recycling vent streams from distillation and storage improves efficiency of the system and avoids the waste of power. Further efficiencies are realized by the process of this invention by prechilling distillation column feed with distillation column vent gas using an interstage flash to recover additional chilling after the first of such exchanger, expanding the non-permeate by-product stream from the first membrane 42, and using the cooling affect to partially condense refrigerant used to liquefy the carbon dioxide vapor.

Although the present invention and its advantages have been described in detail, it should be understood that various changes, substitutions, and alterations can be made therein without departing from the spirit and scope of the invention as defined by the appended claims.

What is claimed is:

1. A process for separating carbon dioxide from a raw gas stream containing carbon dioxide, comprising:
   STEP 1 removing sulfur dioxide, oxides of nitrogen, particulate matter, and water from the gas stream by direct contact cooling, and passing the gas through heat exchanges and water knockouts;
   STEP 2 passing the resultant gas of step 1 through first and second membranes and recycling a nonpermeate gas stream from the second membrane into an inlet of the first membrane;
   STEP 3 treating the permeate gas stream from the second membrane by progressively deep cooling, pressurizing, cooling, deep cooling and passing said permeate gas stream through a water knockout;
   STEP 4 passing the treated permeate gas from the knockout progressively through first and second gas-gas heat exchanger, a condenser, and a distillation column;
   STEP 5 passing a first portion of the gas of step 4 through the distillation column in contact with and countercurrently to a stripping vapor gas passing upwardly through said column;
   STEP 6 progressively passing a second portion of the gas of step 5 through the second and then the first gas-gas heat exchanger, splitting the stream, passing one portion to the desiccant dryer for regeneration of the dryer;
   STEP 7 discharging and recovering a carbon dioxide stream from the distillation column; and
   STEP 8 recovering vapors from the carbon dioxide stream of step 7 and recycling said vapors into at least one of the first and second membranes.

2. The process, as set forth in claim 1, including passing the gas through a venturi scrubber and thereafter into direct contact cooling.

3. The process, as set forth in claim 1, including circulating water through a direct contact cooler.

4. The process, as set forth in claim 3, wherein the gas stream contains sulfur dioxide and the water contains sodium hydroxide.

5. The process, as set forth in claim 1, wherein the gas of step 1, is cooled prior to entering the first knockout and is compressed and then cooled prior to entering the second knockout.

6. The process, as set forth in claim 5, including cooling the gas upstream of the first knockout to about 100 degrees F. by a gas-gas heat exchanger associated with the gas from the second knockout.

7. The process, as set forth in claim 6, including further cooling the gas discharging from the gas-gas heat exchanger to a temperature sufficient to prevent water from condensing in the compressor.

8. The process, as set forth in claim 6, including pressurizing the gas stream immediately downstream of the first knockout.

9. The process, as set forth in claim 8, including first cooling the gas stream discharging from the compressor by a heat exchanger and thereafter deep cooling the stream by a refrigerant heat exchanger to a temperature sufficient to achieve about a 40 percent relative humidity at the first membrane feed temperature and pressure.

10. The process, as set forth in claim 1, including removing contaminants from the gas stream of step 1, by thereafter progressively passing the pressurized gas through a coalescing filter, an adsorption filter and a particulate filter.

11. The process, as set forth in claim 10, including operating the coalescing and adsorption filters to remove traces of compressor oil and sulfur compounds passing through the direct contact cooler.

12. The process, as set forth in claim 10, including operating the particulate filter to remove particulate passing from the absorbent filter.

13. The process, as set forth in claim 1, including maintaining the pressure, temperature, and flow rate of gas delivered to the first membrane at values sufficient for maximum carbon dioxide permeate recovery.

14. The process, as set forth in claim 13, including maintaining the optimum pressure drop across the first membrane at about 5 psig. operating at about 100 degrees F. and a 90 psig. feed pressure.

15. The process, as set forth in claim 1, including pressurizing permeate discharging from the first membrane, then cooling the permeate to a temperature of about 100 degrees F. and filtering said permeate through a water knockout, coalescing filter, adsorption filter and particulate filter and thereafter delivering the permeate gas onto the second membrane.

16. The process, as set forth in claim 1, including maintaining the pressure, temperature and flow rate of gas delivered to the second membrane at values sufficient for obtaining maximum purity of the carbon dioxide permeate.

17. The process, as set forth in claim 1, including maintaining the optimum pressure drop across the second membrane in a range of about 5 to about 30 psig.

18. The process, as set forth in claim 1, including pressurizing and cooling the nonpermeate gas from the second membrane to about the pressure and temperature of the gas entering the inlet of the first membrane.

19. The process, as set forth in claim 1, wherein the permeate gas of step 4 is cooled to a temperature of about 50 degrees F., compressed to a pressure of about 300 psig., cooled to a temperature of about 100 degrees F. and thereafter deep cooling to a temperature of about 50 degrees F.

20. The process, as set forth in claim 19, wherein the apparatus utilized for cooling the gas to 100 degrees F. is one of a water and air cooled heat exchanger and the apparatus utilized for deep cooling the gas to 50 degrees F. is a refrigerant heat exchanger.

21. The process, as set forth in claim 1, wherein Step 4 includes passing the treated permeate gas through one or more desiccant dryers before the first and second exchangers.

22. The process, as set forth in claim 21, wherein there are a pair of desiccant filters connected in parallel.

23. The process, as set forth in claim 1, including passing the effluent gas of step 6 through an overhead condenser and a sump and recycling said effluent gas from said sump to the system at a temperature of about −30 degrees F.

24. The process, as set forth in claim 23, wherein the overhead condenser is a refrigerant condenser.

25. The process, as set forth in claim 24, wherein the refrigerant of the overhead condenser is one of propane, fluorocarbons, carbon dioxide, and liquid ammonia, preferably liquid ammonia.

26. The process, as set forth in claim 1, including passing carbon dioxide discharging from the distillation column through a reboiler, said reboiler generating and passing the stripping vapor stream into the bottom of the distillation column.

27. The process, as set forth in claim 1, including passing the gas of step 5 through a refrigerant condenser and thereafter into an upper portion of the distillation column.

28. The process, as set forth in claim 1, including maintaining the distillation reflux ratio of the distillation column in the range of about 1 to about 4 moles of returning liquid per mole of overhead vapor.

29. The process, as set forth in claim 1, including cooling below the bubble point the carbon dioxide recovered from the distillation column.

30. The process, as set forth in claim 29, wherein cooling below the bubble point is by a refrigerant subcooler apparatus.

31. The process, as set forth in claim 1, wherein the first and second membranes are formed of the same material.

32. A process for separating carbon dioxide from a raw gas stream containing carbon dioxide in an amount, on a dry basis, in the range of about 8 percent to about 85 per cent, comprising:

STEP 1 passing the raw gas stream through a direct contact cooler and removing sulfur dioxide, oxides of nitrogen, and particulate matter;

STEP 2 cooling the gas by passing the gas through a recycle heat exchanger and a heat exchanger;

STEP 3 dewatering the cooled gas by passing it through a water knockout;

STEP 4 pressurizing the gas and cooling the gas to a temperature sufficient to prevent water from condensing upon subsequent compression;

STEP 5 compressing the gas;

STEP 6 cooling the gas by a heat exchanger and thereafter deep cooling the cooled gas by a refrigerant heat exchanger to a temperature sufficient to achieve a relative humidity at the first membrane in the range of about 40 per cent to about 50 per cent;

STEP 7 removing water from the gas stream by passing the cooled gas stream through a second knockout;

STEP 8 passing the gas stream from the second knock-out through the recycle heat exchanger of step 2;

STEP 9 removing aerosols and liquids in a coalescing filter, then removing oil and sulfur compounds in an adsorption filter, and removing particulate passing from the absorbent filter;

STEP 10 mixing gas from the particulate filter with recycle gases received from one or more membranes implemented in one or more subsequent process steps;

STEP 11 passing the mixed gases to a first membrane, separating the gas stream into a nonpermeate stream and a permeate stream, discharging the non permeate stream, and passing the permeate stream to a compressor;

STEP 12 cooling the gas from the compressor and removing contaminants from the cooled gas in a second coalescing filter, second adsorption filter, and a second particulate filter;

STEP 13 passing the cooled gas from the particulate filter to a second membrane, separating the gas stream into a nonpermeate stream and a permeate stream;

STEP 14 pressurizing and cooling the nonpermeate stream from the second membrane and recycling it to the inlet of the first membrane;

STEP 15 cooling the permeate stream from the second membrane and mixing it with a recycle vapor stream from carbon dioxide storage;

STEP 16 pressurizing the cool permeate and recycle stream;

STEP 17 cooling and removing water from the stream of step 16;

STEP 18 dehydrating the stream in a desiccant dryer;

STEP 19 cooling the desiccated gas stream by passing it through first and second recycle gas-gas heat exchanges;

STEP 20 passing the cooled, desiccated gas stream through a primary condenser and into and through a distillation column in counter current flow to stripping vapors and carbon dioxide passing upwardly through the distillation column;

STEP 21 condensing the gas of step 20, passing the gas from the condenser through a sump and discharging an effluent recycle stream from the top of the sump and a reflux stream from the bottom of the sump;

STEP 22 passing the reflux stream into an upper portion of the distillation column;

STEP 23 passing the effluent recycle stream through the second and then the first recycle gas-gas heat exchanges;

STEP 24 splitting the effluent recycle stream and passing one portion to the desiccant filter for regeneration;

STEP 25 passing liquid carbon dioxide from the bottom of the distillation column into a reboiler;

STEP 26 generating stripping vapors in the reboiler and passing them into a lower portion of the distillation column;

STEP 27 discharging liquid carbon dioxide from one or both of the reboiler and distillation column, cooling the discharge to a temperature below the bubble point, and delivering the cooled liquid carbon dioxide into an insulated storage tank; and STEP 28 recovering vapors from the storage tank and recycling them to the inlet of the first membrane.

33. A process for recovering a target gas from a gas stream containing two or more gases, comprising:

providing a feed stream containing a mixture of at least a target gas and at least one other gas;

delivering the feed stream through a first membrane separator within a first pressure range;

directing a first discharge stream containing a higher purity of the target gas than the feed stream from the first membrane separator to a second membrane separator within a second pressure range;

recovering from the second membrane separator a second discharge stream containing a relatively higher purity of the target gas than the first discharge stream entering the second membrane separator; and substantially maintaining the pressure differential between the feed stream and a discharge stream exiting the first membrane at a level substantially less than the pressure differential between the first discharge stream entering the second membrane and a discharge stream exiting the second membrane.

34. The process, as set forth in claim 33, including maintaining the pressure, temperature and flow rate of the feed stream delivered to the first membrane at values sufficient for maximum target gas recovery.

35. The process, as set forth in claim 33, including substantially maintaining the pressure differential between the feed stream entering and the first membrane and a discharge stream exiting the first membrane in a range from about 5 psig to about 30 psig.

36. The process, as set forth in claim 35, including substantially maintaining the pressure of the feed stream delivered to the first membrane at about 90 psig.

37. The process, as set forth in claim 36, including substantially maintaining the tewmperature of the feed stream delivered to the first membrane at about 100 degrees F.

38. The process, as set forth in claim 33, including substantially maintaining the pressure, temperature and flow rate of the first discharge stream delivered to the second membrane at values sufficient for obtaining maximum purity of the target gas.

39. The process, as set forth in claim 35, wherein the pressure differential between the feed stream entering the first membrane and the non-permeate stream exiting the first membrane is maintained at about 5 psig.

40. The process, as set forth in claim 33, including substantially maintaining the pressure differential between the first discharge stream delivered to the second membrane and a discharge stream exiting the second membrane in a range of about 5 psig. to about 30 psig.

41. The process, as set forth in claim 40, wherein the pressure differential between the first permeate stream delivered to the second membrane and the non-permeate stream exiting the second membrane is maintained at about 30 psig.

42. The process, as set forth in claim 33, further comprising regulating the pressure of a discharge stream exiting the first membrane to at least in part maintain the pressure differential between the feed stream entering and the first membrane and another discharge stream exiting the first membrane.

43. The process, as set forth in claim 41, including regulating the pressure of a discharge stream exiting the first membrane to at least in part maintain the pressure differential between feed gaseous stream and another discharge stream exiting the first membrane, wherein the regulated discharge stream contains a lesser purity of the target gas than the other discharge stream exiting the first membrane.

44. The process, as set forth in claim 33, wherein the target gas is carbon dioxide.

45. A process for recovering a target gas from a gas stream containing two or more gases, comprising:

providing a feed stream containing a mixture of at least a target gas and at least on other gas;

delivering the feed stream through a first membrane separator within a first pressure range;

directing a first permeate stream containing a higher purity of the target gas than the feed stream from the first membrane separator to a second membrane separator within a second pressure range;

recovering from the second membrane separator a second permeate stream containing a relatively higher purity of the target gas than the first permeate stream; and substantially maintaining the pressure differential between the feed stream and the non-permeate stream exiting the first membrane at a level substantially less than the pressure differential between first permeate stream entering the second membrane and the non-permeate stream exiting the second membrane.

46. The process, as set forth in claim 45, including maintaining the pressure, temperature and flow rate of the feed stream delivered to the first membrane at values sufficient for maximum target gas recovery.

47. The process, as set forth in claim 45, including substantially maintaining the pressure differential between the feed stream entering the first membrane and the non-permeate stream exiting the first membrane in a range from about 5 psig to about 30 psig.

48. The process, as set forth in claim 47, including substantially maintaining the pressure of the feed stream delivered to the first membrane at about 90 psig.

49. The process, as set forth in claim 48, including substantially maintaining the temperature of the feed stream delivered to the first membrane at about 100 degrees F.

50. The process, as set forth in claim 47, wherein the pressure differential between the feed stream entering the first membrane and the non-permeate stream exiting the first membrane is maintained at about 5 psig.

51. The process, as set forth in claim 45, including substantially maintaining the pressure, temperature and flow rate of the first permeate stream delivered to the second membrane at values sufficient for obtaining maximum purity of the target gas.

52. The process, as set forth in claim 45, including substantially maintaining the pressure differential between the first permeate stream delivered to the second membrane and the non-permeate stream exiting the second membrane in a range of about 5 psig to about 30 psig.

53. The process, as set forth in claim 52, wherein the pressure differential between the first permeate stream delivered to the second membrane and the non-permeate stream exiting the second membrane is maintained at about 30 psig.

54. The process, as set forth in claim 45, further comprising regulating the pressure of a discharge stream exiting the first membrane to at least in part maintain the pressure differential between the feed stream entering the first membrane and the non-permeate stream exiting the first membrane.

55. The process, as set forth in claim 45, wherein the target gas is carbon dioxide.

\* \* \* \* \*

UNITED STATES PATENT AND TRADEMARK OFFICE
CERTIFICATE OF CORRECTION

PATENT NO. : 6,085,549
DATED : July 11, 2000
INVENTOR(S) : Daus et al.

It is certified that error appears in the above-identified patent and that said Letters Patent is hereby corrected as shown below:

| | |
|---|---|
| Column 4, line 22 | Delete "43" |
| Column 4, line 23 | After "[non-]permeate stream" Insert --43-- |
| Column 4, line 25 | After "non-permeate stream" Insert --43-- |
| Column 11, line 41 | Delete "tewmperature" Insert --temperature-- |

UNITED STATES PATENT AND TRADEMARK OFFICE
CERTIFICATE OF CORRECTION

PATENT NO. : 6,085,549
DATED : July 11, 2000
INVENTOR(S) : Daus et al.

It is certified that error appears in the above-identified patent and that said Letters Patent is hereby corrected as shown below:

Column 12, line 2     After "between" Insert --the--

Column 12, line 2     Delete "gaseous"

Signed and Sealed this

Seventeenth Day of April, 2001

Attest:

NICHOLAS P. GODICI

Attesting Officer     Acting Director of the United States Patent and Trademark Office